(12) United States Patent (10) Patent No.: US 8,315,467 B2
Nakamura et al. (45) Date of Patent: Nov. 20, 2012

(54) IMAGE ENCODING DEVICE AND IMAGE ENCODING METHOD

(75) Inventors: Katsuyuki Nakamura, Saitama (JP); Toru Yokoyama, Sagamihara (JP); Shohei Saito, Yokohama (JP)

(73) Assignee: Renesas Electronics Corporation, Kanagawa (JP)

( * ) Notice: Subject to any disclaimer, the term of this patent is extended or adjusted under 35 U.S.C. 154(b) by 769 days.

(21) Appl. No.: 12/434,851

(22) Filed: May 4, 2009

(65) Prior Publication Data

US 2009/0297053 A1 Dec. 3, 2009

(30) Foreign Application Priority Data

May 29, 2008 (JP) ................................. 2008-140255

(51) Int. Cl.
*G06K 9/36* (2006.01)
(52) U.S. Cl. ........................................ 382/232
(58) Field of Classification Search ........................ None
See application file for complete search history.

(56) References Cited

U.S. PATENT DOCUMENTS

| 6,148,109 | A * | 11/2000 | Boon et al. ............... 382/238 |
| 6,426,975 | B1 * | 7/2002 | Nishi et al. ............... 375/240.13 |
| 7,706,442 | B2 * | 4/2010 | Kuo ............................. 375/240.12 |
| 7,822,119 | B2 * | 10/2010 | Boon et al. ............... 375/240.12 |
| 7,953,284 | B2 * | 5/2011 | Au et al. ..................... 382/236 |
| 8,059,717 | B2 * | 11/2011 | Saigo et al. ............... 375/240.12 |
| 2006/0126730 | A1 * | 6/2006 | Arakawa et al. ......... 375/240.03 |
| 2006/0215763 | A1 | 9/2006 | Morimoto et al. |
| 2006/0222066 | A1 * | 10/2006 | Yoo et al. .................. 375/240.03 |
| 2006/0239349 | A1 | 10/2006 | Shibayama |
| 2007/0098070 | A1 * | 5/2007 | Saigo et al. ............... 375/240.12 |
| 2008/0056363 | A1 * | 3/2008 | Lyashevsky et al. ..... 375/240.13 |
| 2009/0110077 | A1 * | 4/2009 | Amano et al. ............ 375/240.16 |
| 2009/0316780 | A1 * | 12/2009 | Tchernatinsky et al. 375/240.02 |

FOREIGN PATENT DOCUMENTS

| JP | 2006-270437 A | 10/2006 |
| JP | 2006-304102 A | 11/2006 |
| JP | 2007150913 A * | 6/2007 |

OTHER PUBLICATIONS

S. Mochizuki et al., A Low Power and High Picture Quality H.264/MPEG-4 Video Codec IP for HD Mobile Applications, IEEE Asian Solid-State Circuits Conference, Nov. 12-14, 2007, pp. 176-179.

* cited by examiner

*Primary Examiner* — Samir Ahmed
(74) *Attorney, Agent, or Firm* — Mattingly & Malur, PC

(57) ABSTRACT

The invention aims at reducing the circuit size while maintaining the creation of a predictive image suitable for the intra prediction based on a pipeline processing. The encoding device is operated to perform intra prediction in blocks of pixels resulting from division of a frame of a moving image has a pseudo-local-decode-image-creation module for simply encoding an original image, and an intra prediction module for using the created pseudo local decode image to select an intra prediction mode. In the intra prediction based on pipeline processing, the pipeline stage for selecting an intra prediction mode and the pipeline stage for creating predictive image data according to the selected intra prediction mode are separated.

11 Claims, 11 Drawing Sheets

IMAGE ENCODING DEVICE AND IMAGE ENCODING METHOD

CLAIM OF PRIORITY

The Present application claims priority from Japanese application JP 2008-140255 filed on May 29, 2008, the content of which is hereby incorporated by reference into this application.

FIELD OF THE INVENTION

The present invention relates to an image encoding device for coding an image and an image encoding method therefor, and particularly it relates to a technique for selecting an intra prediction mode.

BACKGROUND OF THE INVENTION

In the field of image encoding techniques of recent years, an in-screen prediction technique (i.e., intra prediction technique) that a spatial correlation that images have is utilized to increase a compression rate thereof has been adopted. According to the intra prediction technique, a predictive image of an encode-target block 101 is created using predicted pixels 102 of reference blocks 103-106, as shown in FIG. 11. Incidentally, a "block" represents a set of pixels, i.e., a macroblock, and as its size is used e.g., 4×4, 8×8 or 16×16.

In such image creation, predicted pixels 102 are copied in defined directions of prediction (prediction modes), whereby a predictive image is produced. According to H.264/AVC standard, prediction modes as shown in FIG. 12 are used. The total number of prediction modes and mode numbers vary depending on the block size. For example, with brightness signals, nine kinds of intra 4×4 prediction modes, nine kinds of intra 8×8 prediction modes and four kinds of intra 16×16 prediction modes are defined. In addition, as to color-difference signals, four kinds of intra prediction modes are defined. A predictive image of an encode-target block is created according to prediction modes decided by taking into account the block size. Then, one mode which achieves the minimum value of encoding cost (the smallest prediction error) is selected, and an encode is performed.

Encode standards of recent years, typified by H.264/AVC, require high calculation costs. Therefore, in performing an encoding process by means of hardware, arrangements to shorten the processing time by pipeline processing are made in general. For example, as shown in FIG. 13, an encoding process is divided into some stages to handle them in parallel, thereby shortening the processing time. In the case of FIG. 13, such stages include stages of DMA (Direct Memory Access) read, coarse motion search, fine motion search, predictive image creation, and DMA write. In this example, only primary parts involved in image processing are described, and there is no description about a variable codeword length coding, using VLC (Variable Length Coding) and the like. The stage of predictive image creation is herein arranged as shown in FIG. 14, for example. The predicted pixel buffer 1201 is a buffer for storing predicted pixels 102 of reference blocks 103-106. In the intra prediction step 1202, predicted pixels 102 are copied in a direction of prediction decided in the intra prediction mode select step 1207, whereby a predictive image is created. In the orthogonal transformation step 1203, an orthogonal transformation technique such as DCT (Discrete Cosine Transform) is used to transform a predictive image into orthogonal transformation coefficients. In the quantization step 1204, the orthogonal transformation coefficients are quantized to output quantized coefficients. In the inverse quantization step 1205, an inverse quantization is performed on the quantized coefficients output as a result of the quantization step 1204. In the inverse orthogonal transformation step 1206, an inverse orthogonal transformation is performed on inverse-quantized coefficients output as a result of the inverse quantization step 1205. After going through the orthogonal transformation step 1203, quantization step 1204, inverse quantization step 1205, and inverse orthogonal transformation step 1206, local decode images are created in all the predictable modes concerning the above-described sizes of intra 4×4, intra 8×8 and intra 16×16. In the intra prediction mode select step 1207, local decode images of the respective modes are compared thereby to select an intra prediction mode with the minimum prediction error. In the intra/inter prediction mode select step 1208, an intra predictive image created in the intra prediction step 1202 and an inter predictive image are compared thereby to output an image with a smaller prediction error as a predictive image.

The number of modes that can be predicted in the intra prediction is extremely numerous. Therefore, because of limitations of processing time, it is often difficult to execute, in series, the orthogonal transformation step 1203, quantization step 1204, inverse quantization step 1205, and inverse orthogonal transformation step 1206 for all the modes thereby to create local decode images. Hence, the processing time can be shortened by, e.g., arranging parallel circuits in groups of steps with no dependence therebetween, as shown by 1209-1212 of FIG. 14. However, the arrangement of such parallel circuits poses the problem of the increasing circuit size.

To prevent the increase in the circuit size, a method which includes moving the intra prediction mode select step larger in processing amount to another pipeline stage, and using an original image instead of a local decode image to perform the intra prediction mode select step has been proposed by Seiji Mochizuki, Tetsuya Shibayama, Masaru Hase, Fumitaka Izuhara, Kazushi Akie, Masaki Nobori, Ren Imaoka, Hiroshi Ueda, Kazuyuki Ishikawa, and Hiromi Watanabe, in "A Low Power and High Picture Quality H.264/MPEG-4 Video Codec IP for HD Mobile Applications", IEEE Asian Solid-State Circuits Conference Proceedings, pp. 176-179, 2007. Also, a countermeasure such that the growth of the circuit size is suppressed by decreasing the number of used prediction modes can be taken.

SUMMARY OF THE INVENTION

The prediction accuracy can be lower in a case that the selection of intra prediction modes and the creation of a predictive image are allocated to different pipeline stages, and an original image is used to make the selection of intra prediction modes. This is because a local decode image has undergone encoding and decoding steps, and is not necessarily the same as the original image. In addition, even if the total number of usable prediction modes is decreased, a selected prediction mode is not necessarily the most appropriate one.

The invention was made in consideration of the above problems. It is an object of the invention to provide an image encoding device and an image encoding method, which allow a reduction in circuit size while maintaining creation of a predictive image suitable for the intra prediction using a pipeline processing.

The above and other objects of the invention and novel features thereof will become clear from the description hereof and the accompanying drawings.

Next, a preferred embodiment of the invention herein disclosed will be outlined below briefly.

Specifically, an image encoding device according to a preferred embodiment of the invention encodes a difference between original image data and predictive image data, decodes encoded data, which has been encoded, to create local decode image data, more simply encodes and decodes original image data in comparison to creation of the local decode image data to create pseudo local decode image data for selecting an intra prediction mode, and uses the pseudo local decode image data to select an intra prediction mode. In creating pseudo local decode image data, Hadamard transformation and its inverse transformation are used instead of frequency transformation, e.g., DCT, and its inverse transformation. As a result, the load owing to the arithmetic process to acquire pseudo local decode image data is lightened in comparison to local decode image data. Hence, the need for preparing circuits for creating local decode image data in parallel in response to various intra prediction modes is eliminated. Also, it is not required to directly use original image data to select an intra prediction mode.

Now, an effect which the preferred embodiments of the invention herein disclosed achieve will be described below briefly.

That is, the invention allows the reduction of the circuit size while maintaining the creation of a predictive image suitable for the intra prediction based on a pipeline processing.

DETAILED DESCRIPTION OF THE PREFERRED EMBODIMENTS

1. Summary of the Preferred Embodiments

Figure 1:
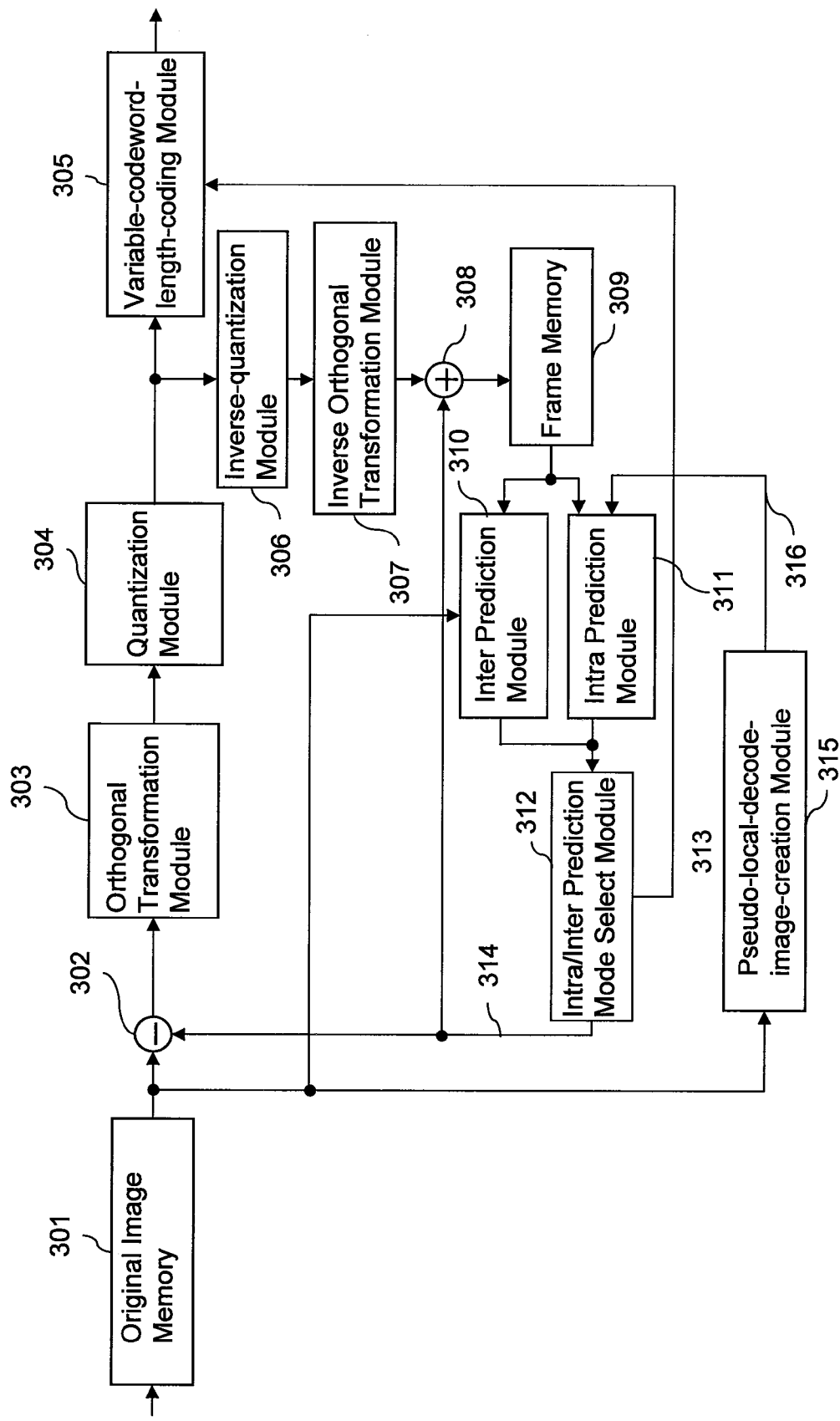
FIG. 1 is a block diagram showing an example of an image encoding device according to a first embodiment of the invention.

First, the preferred embodiments of the invention herein disclosed will be outlined.

[1] The image encoding device which can encode a difference between original image data and predictive image data, and create the predictive image data based on local decode image data obtained by decode of encoded data has: an intra prediction module operable to create the predictive image data by means of intra prediction in blocks of pixels resulting from division of a frame of image data; and a pseudo-local-decode-image-creation module operable to more simply encode and decode original image data in comparison to creation of the local decode image data. The intra prediction module includes a mode select module for selecting an intra prediction mode, and a predictive data creation module for creating the predictive image data by means of intra prediction according to the operation mode selected by the mode select module. The mode select module can use pseudo local decode image data created by the pseudo-local-decode-image-creation module to select an intra prediction mode.

The creation of pseudo local decode image data is lightened in load owing to the arithmetic process in comparison to creation of local decode image data. Consequently, the need for preparing circuits for creating local decode image data in parallel in response to various intra prediction modes is eliminated. Also, it is not required to directly use original image data to select an intra prediction mode. Hence, it becomes possible to reduce the circuit size while maintaining the creation of a predictive image suitable for the intra prediction based on a pipeline processing.

[2] In the image encoding device as described in [1], the pseudo-local-decode-image-creation module performs, e.g., Hadamard transformation, quantization, inverse quantization, and inverse Hadamard transformation thereby to create pseudo local decode image data. Particularly, as Hadamard transformation and its inverse transformation can be adopted instead of frequency transformation and its inverse transformation, which are longer in arithmetic processing time, the arithmetic processing time can be shortened largely.

[3] In the image encoding device as described in [1], the pseudo-local-decode-image-creation module performs quantization and inverse quantization thereby to create pseudo local decode image data. Particularly, the frequency transformation and its inverse transformation longer in arithmetic processing time are omitted, and therefore the arithmetic process can be shortened by the creation of pseudo local decode image data per se. However, in this case, the prediction accuracy is lowered, and thus the encoding efficiency is decreased in comparison to the device as described in [2].

[4] In the image encoding device as described in [1], the intra prediction module arranges the mode select module and the predictive data creation module to execute respective process steps in different pipeline stages, which can contribute to shortening of the time of one slot.

[5] The image encoding device as described in [1] further includes a predicted pixel select module for deciding whether or not to use predicted pixel data of a pseudo local decode image for mode selection by the mode select module. In the image encoding device, in a case that the predicted pixel select module has decided to use predicted pixel data of a pseudo local decode image, the mode select module uses predicted pixel data of a pseudo local decode image to select a mode, whereas in a case that the predicted pixel select module has decided not to use predicted pixel data of a pseudo local decode image, the mode select module uses predicted pixels of local decode image data to select a mode. In a case of handling image data which does not require that a prediction mode be selected rapidly, remaining freedom of the choice of using a predicted pixel of local decode image data to select a mode enables more highly accurate mode selection.

[6] In the image encoding device as described in [1], the pseudo-local-decode-image-creation module uses pseudo local decode image data of an input pixel block to select and extract predicted pixel data of sub-blocks.

[7] The image encoding method includes first to fifth steps. The first step is that of encoding a difference between original image data and predictive image data. The second step is that of decoding data encoded in the first step to create local decode image data. The third step is that of more simply encoding and decoding original image data in comparison to creation of the local decode image data to create pseudo local decode image data. The fourth step is that of using the pseudo local decode image data created in the third step to select an intra prediction mode. The fifth step is that of creating the predictive image data by means of intra prediction using the local decode image data, according to the operation mode selected in the fourth step.

[8] In the image encoding method as described in [7], the third step includes, e.g., performing Hadamard transformation, quantization, inverse quantization, and inverse Hadamard transformation thereby to create pseudo local decode image data.

[9] In the image encoding method as described in [7], the third step includes performing quantization and inverse quantization thereby to create pseudo local decode image data.

[10] In the image encoding method as described in [7], the fourth and fifth steps are executed in different pipeline stages.

[11] The image encoding method includes first to sixth steps. The first to third steps are the same as those described in [7]. The fourth step is that of deciding whether or not to use the pseudo local decode image data created in the third step for selecting an intra prediction mode. The fifth step is that which includes using the pseudo local decode image data to select an intra prediction mode in a case that use of the pseudo local decode image data has been decided in the fourth step, and using the local decode image data to select an intra prediction mode in a case that nonuse of the pseudo local decode image data has been decided in the fourth step. The sixth step is that of creating the predictive image data by means of intra prediction according to the operation mode selected in the fifth step.

2. Further Detailed Description of the Preferred Embodiments

The embodiments will be described further in detail. The detailed description about the forms for carrying out the invention will be presented below with reference to the drawings. It is noted that in all the drawings to which reference is made in describing the forms for carrying out the invention, the constituents or elements having identical functions are identified by the same reference numeral, and the repeated description thereof is omitted herein.

First Embodiment

FIG. 1 shows an example of an image encoding device according to a first embodiment. The image encoding device according to the first embodiment has: an original image memory 301; a subtracter 302; an orthogonal transformation module 303; a quantization module 304; a variable-codeword-length-coding module 305; an inverse quantization module 306; an inverse orthogonal transformation module 307; an adder 308; a frame memory 309; an inter prediction module 310; an intra prediction module 311; an intra/inter prediction mode select module 312; and a pseudo-local-decode-image-creation module 315.

The original image memory 301 buffers data of an original image frame temporarily. The subtracter 302 determines the difference between original image data and predictive image data prepared by the intra/inter prediction mode select module 312 to prepare difference image data. The orthogonal transformation module 303 uses an orthogonal transformation technique like DCT to transform the difference image data prepared by the subtracter 302 into orthogonal transformation coefficients. The quantization module 304 quantizes the orthogonal transformation coefficients, and outputs quantized coefficients. The variable-codeword-length-coding module 305 uses, e.g., a Huffman code and an arithmetic code to encode quantized coefficients output by the quantization module 304, and a prediction mode 313 output by the intra/inter prediction mode select module 312, and outputs them as image compression information. The inverse quantization module 306 performs an inverse quantization on the quantized coefficients output by the quantization module 304. The inverse orthogonal transformation module 307 conducts an inverse orthogonal transformation on the inverse-quantized coefficients output by the inverse quantization module 306. The adder 308 adds together the difference image data output by the inverse orthogonal transformation module 307, and the predictive image data 314 output by the intra/inter prediction mode select module 312, and then outputs local decode image data. The local decode image data is equivalent to decoded image data in a decoder. The intra prediction according to H.264/AVC standards is performed with reference to such local decode image data. The frame memory 309 stores local decode image data prepared by the adder 308. The inter prediction module 310 uses original image data stored in the original image memory 301, and local decode image data stored in the frame memory 309 to detect and compensate a motion and then creates inter predictive image data. The pseudo-local-decode-image-creation module 315 uses original image data stored in the original image memory 301 to create pseudo local decode image data 316. The intra prediction module 311 reads out a predicted pixel from the pseudo local decode image data 316, and selects an intra prediction mode. After that, the intra prediction module 311 uses the local decode image data to create intra predictive image (in-screen predictive image) data based on the selected prediction mode. The intra/inter prediction mode select module 312 outputs, of intra predictive image data created by the intra prediction module 311 and inter predictive image (inter-screen predictive image) data created by the inter prediction module 310, a predictive image 314 smaller in prediction error with respect to an original image data. Also it concurrently outputs a prediction mode 313 which minimizes the prediction error.

Figure 2:
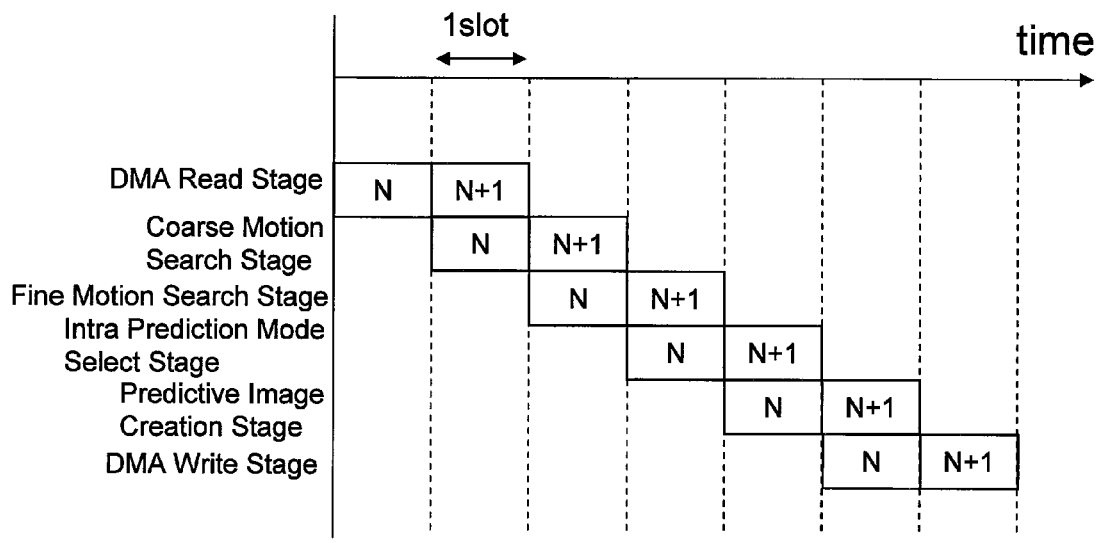
FIG. 2 is an illustration showing an example of a pipeline arrangement according to the first embodiment of the invention.

As described above, the intra prediction module 311 selects an intra prediction mode and creates intra predictive image data (in-screen predictive image); these steps are handled in different pipeline stages as shown by the example of FIG. 2. Thus, the processing amount for creation of predictive image data and the circuit size are reduced. While the stage of selecting an intra prediction mode is set as an independent stage as in FIG. 2, it may be included in an unoccupied stage for some other resource. The point is that it is sufficient to allocate the intra prediction mode select step and the intra predictive image data creation step to different pipeline stages.

Figure 3:
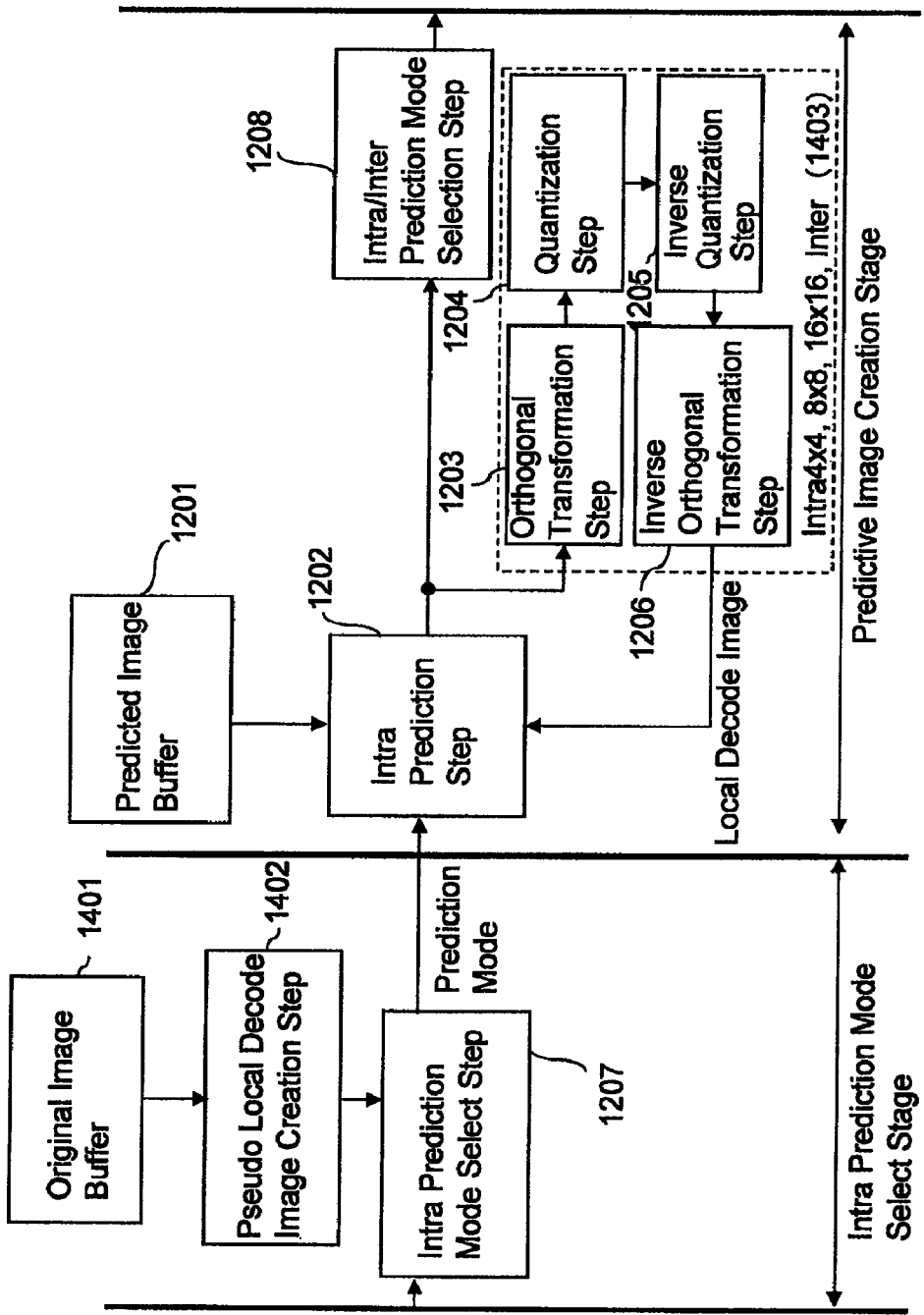
FIG. 3 is an illustration showing an example of an arrangement of pipeline stages according to the first embodiment of the invention.

FIG. 3 presents a block diagram showing the stage of selecting an intra prediction mode, and the stage of predictive image creation. The original image buffer 1401 is a buffer for storing an original image. The pseudo local decode image creation step 1402 is a process step by which an original image is encoded simply thereby to create a pseudo local decode image, and it is executed by the pseudo-local-decode-image-creation module 315. The detail of this step will be described later. In the intra prediction mode select step 1207, a comparison among pieces of pseudo local decode image data that the pseudo-local-decode-image-creation module 315 has created in respective prediction modes is made thereby to select a prediction mode which achieves a minimum encoding cost (a minimum prediction error). With the predictive image creation stage, in the intra prediction step 1202, predicted pixels 102 are copied along a direction of prediction decided in the intra prediction mode select step 1207, whereby predictive image data are created. Then, the orthogonal transformation step 1203 is carried out on the created predictive image data. The resultant transformation coefficients undergo the quantization step 1204. The coefficients thus quantized are inverse-quantized in the inverse quantization step 1205. The inverse-quantized coefficients go through an inverse orthogonal transformation in the inverse orthogonal transformation step 1206 (1403). Consequently, a local decode image depending on the prediction mode is created. In the intra/inter prediction mode select step 1208, a comparison between an intra predictive image created in the intra prediction step 1202, and an inter predictive image are made, and then the image smaller in prediction error is output as a predictive image.

Next, a process step in the pseudo-local-decode-image-creation module 315 will be described. As described above, typically in the intra prediction step, local decode image data stored in the frame memory 309 is used to select an intra prediction mode. However, as stated in the "BACKGROUND", to create local decode image data in all of predictable modes, parallel executions are often needed, and thus the circuit size is increased. In addition, even if the intra prediction mode select step larger in processing amount is transferred to a different pipeline stage to select an intra prediction mode with an original image for the purpose of preventing the increase in the circuit size, the prediction accuracy can end up being lowered. Hence, the pseudo-local-decode-image-creation module 315 is arranged so as to perform a predetermined transformation on an original image data thereby to create pseudo local decode image data, and then select an intra prediction mode. In general, in encoding, the steps of orthogonal transformation, quantization, inverse quantization, and inverse orthogonal transformation are executed. Therefore, if the steps are simplified, the creation of pseudo local decode image data can be achieved while reducing the processing amount. Hence, in this embodiment, the creation of pseudo local decode image data at a low operation cost is realized by Hadamard transformation instead of orthogonal transformation, and inverse Hadamard transformation instead of inverse orthogonal transformation.

Figure 4:
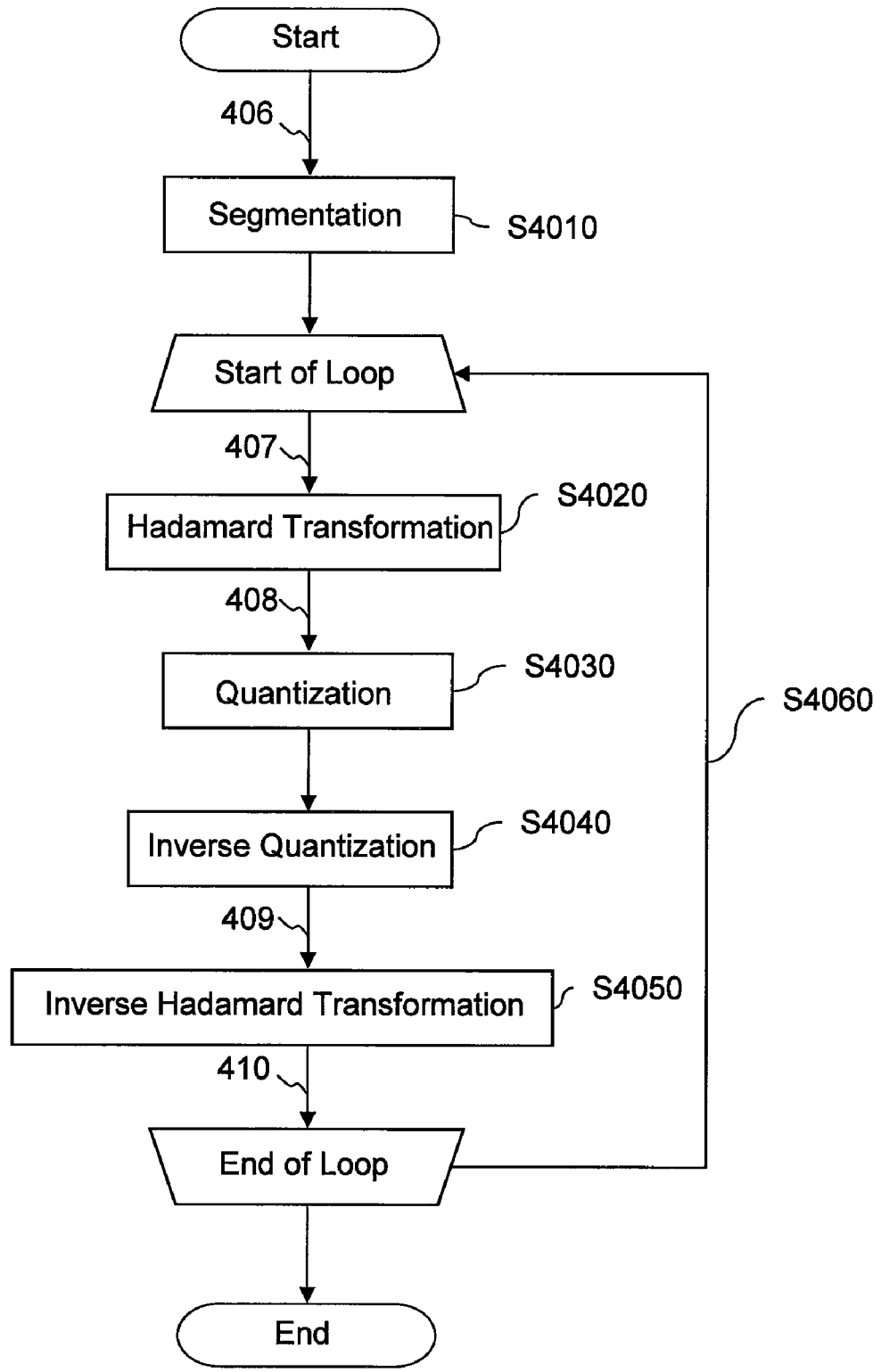
FIG. 4 is a flowchart of a step of creating a pseudo local decode image according to the first embodiment of the invention.

FIG. 4 is a flowchart showing an example of a process step by the pseudo-local-decode-image-creation module 315. First, original image data 406 entered in blocks are segmented into sub-blocks, like in 8×8 pixels and 4×4 pixels (S4010). The size for the segmentation is not limited to the forementioned ones as long as it is equal to or above a unit of 1×1 pixels. After that, the Hadamard transformation is performed on the resultant sub-blocks 407 (S4020). The Hadamard transformation is an orthogonal transformation technique which can be realized only by addition and subtraction, and by which a simple frequency resolution can be performed by multiplying an input block by n-th Hadamard matrix Hn. Now, an input pixel block is represented by X(407), and an output coefficient matrix of Hadamard transformation is represented by Y(408). Here, assuming that the size of an input block is the unit of 4×4 pixels, a 4×4 Hadamard transformation is performed according to the following expression:

$$Y = \frac{1}{4} H_4 X H_4^T, \tag{1}$$

where the transformation matrix $H_4$ is given by:

$$H_4 = \begin{bmatrix} 1 & 1 & 1 & 1 \\ 1 & 1 & -1 & -1 \\ 1 & -1 & -1 & 1 \\ 1 & -1 & 1 & -1 \end{bmatrix}, \tag{2}$$

and
examples of X and Y are given by:

$$X = X_{ij}, (i,j=0, 1, 2, 3), \text{ and } Y = Y_{ij}, (i,j=0, 1, 2, 3) \tag{3}.$$

Likewise, if the size of the input block is the unit of 8×8 pixels, an 8×8 Hadamard transformation is conducted according to the following expression (4).

$$Y = \frac{1}{8} H_8 X H_8^T \tag{4}$$

where the transformation matrix $H_8$ is given by:

$$H_8 = \begin{bmatrix} 1 & 1 & 1 & 1 & 1 & 1 & 1 & 1 \\ 1 & 1 & 1 & 1 & -1 & -1 & -1 & -1 \\ 1 & 1 & -1 & -1 & -1 & -1 & 1 & 1 \\ 1 & 1 & -1 & -1 & 1 & 1 & -1 & -1 \\ 1 & -1 & -1 & 1 & 1 & -1 & -1 & 1 \\ 1 & -1 & -1 & 1 & -1 & 1 & 1 & -1 \\ 1 & -1 & 1 & -1 & -1 & 1 & -1 & 1 \\ 1 & -1 & 1 & -1 & 1 & -1 & 1 & -1 \end{bmatrix}, \tag{5}$$

and
$H_8^T$ represents the transposed matrix thereof, and examples of X and Y are given by expression (6):

$$X = X_{ij}, (i,j=0, 1, 2, \ldots, 7), \text{ and } Y = Y_{ij}, (i,j=0, 1, 2, \ldots, 7) \tag{6}.$$

Incidentally, if the size of the input block is the unit of 16×16 pixels, a 16×16 block is resolved into units of 4×4 pixels, and then a 4×4 Hadamard transformation is conducted. Alternatively, a 16×16 Hadamard transformation may be defined and performed additionally.

Next, a coefficient matrix Y(408) obtained from the Hadamard transformation is quantized (S4030). At the time of quantization, the width of a quantization step depends on quantization parameters. Therefore, if the value is calculated and stored in a lookup table in advance, the processing can be speeded up. After that, the inverse quantization is performed, and thus an inverse-quantized coefficient matrix Y' (409) is obtained (S4040). Like the quantization step, the inverse quantization can be speeded up by use of a lookup table. As a matter of course, the quantization and inverse quantization may be a typical arithmetic processing.

At the end, an inverse Hadamard transformation is conducted on the inverse-quantized coefficient matrix Y' (409) resulting from the inverse quantization (S4050). The 4×4 inverse Hadamard transformation is performed by the following expression (7), and the 8×8 inverse Hadamard transformation is conducted by the expression (8).

$$X' = \frac{1}{4} H_4 Y' H_4^T, \quad (7)$$

and $$X' = \frac{1}{8} H_8 Y' H_8^T. \quad (8)$$

X' thus determined makes a pseudo local decode image. The intra prediction module (311) uses the pseudo local decode image X' (410) to perform an intra prediction. The intra prediction module repeats the step by the number of blocks resulting from the segmentation (S4060), and determines a pseudo local decode image for each sub-block.

Figure 5:
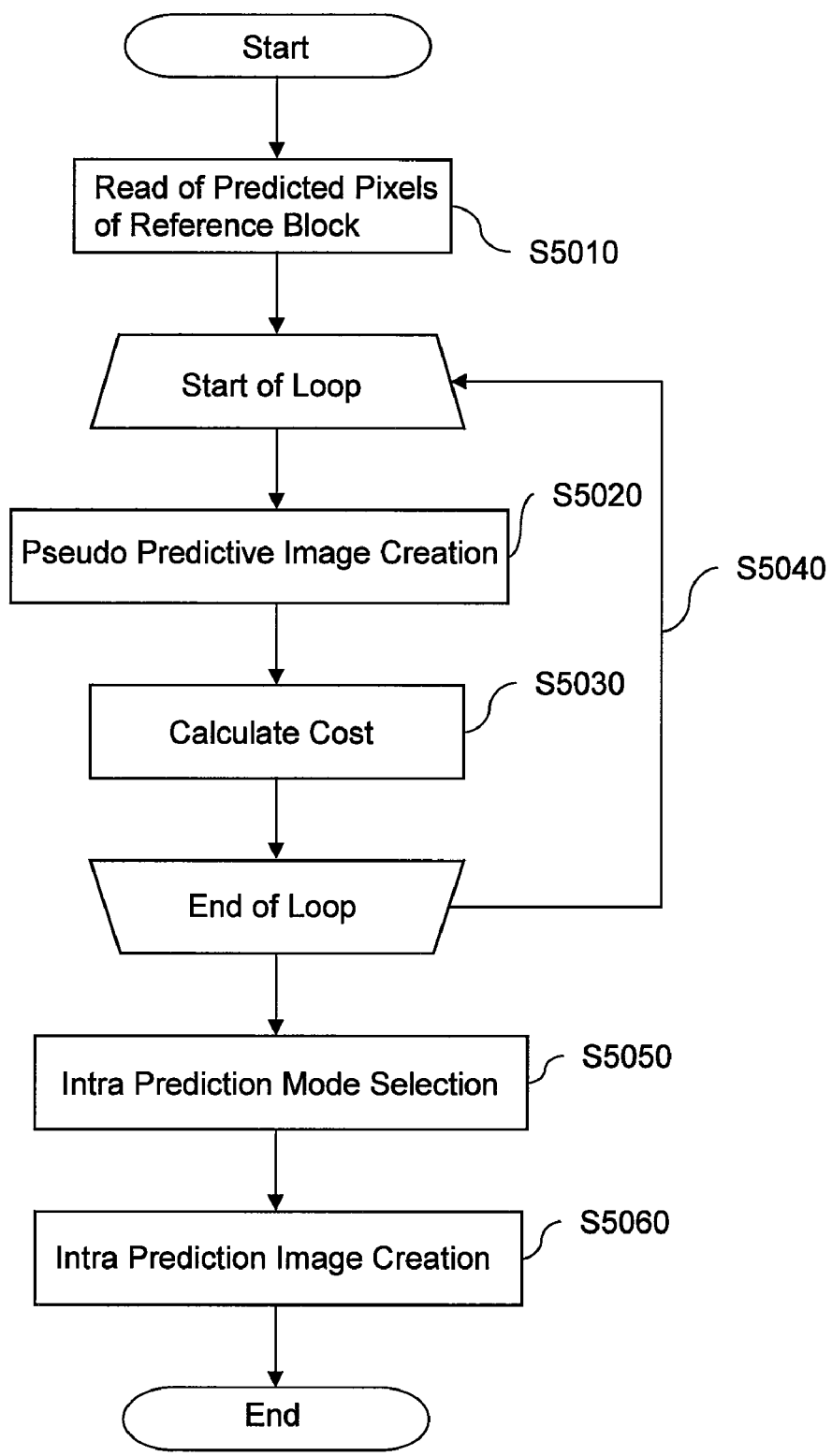
FIG. 5 is a flowchart of an intra prediction step according to the first embodiment of the invention.
Figure 12:
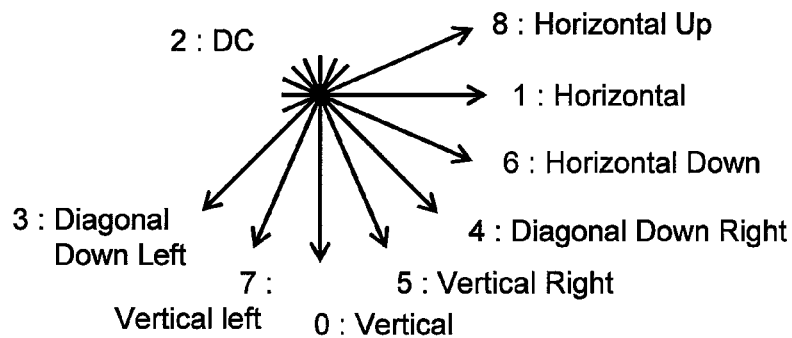
FIG. 12 is an illustration for explaining the intra prediction encoding method, which the inventors has examined.
Figure 13:
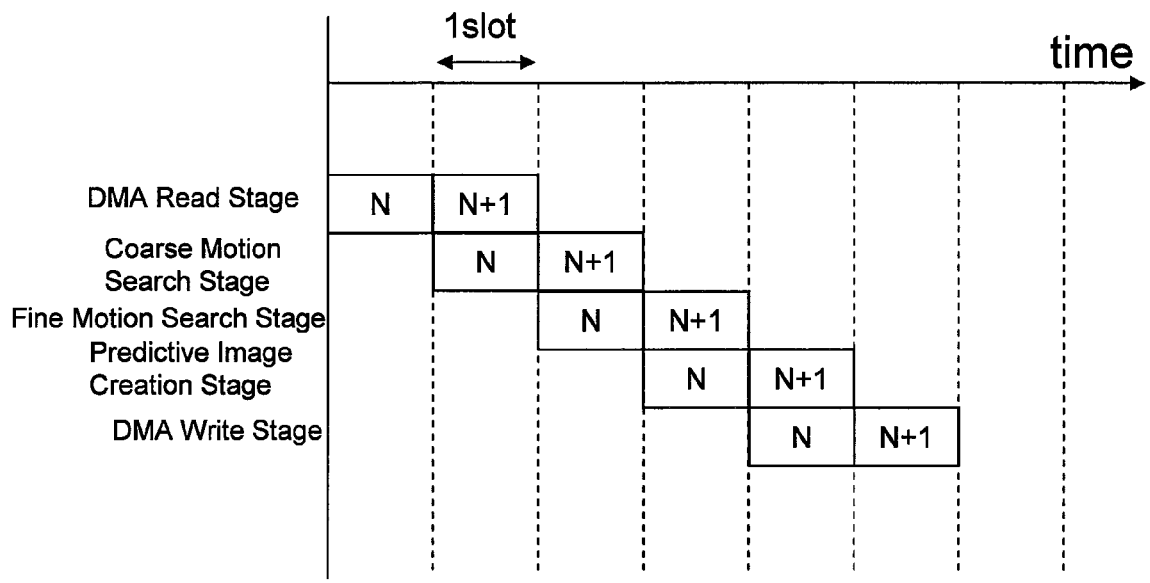
FIG. 13 is an illustration for explaining the pipeline according to the encoding method, which the inventors has examined.
Figure 14:
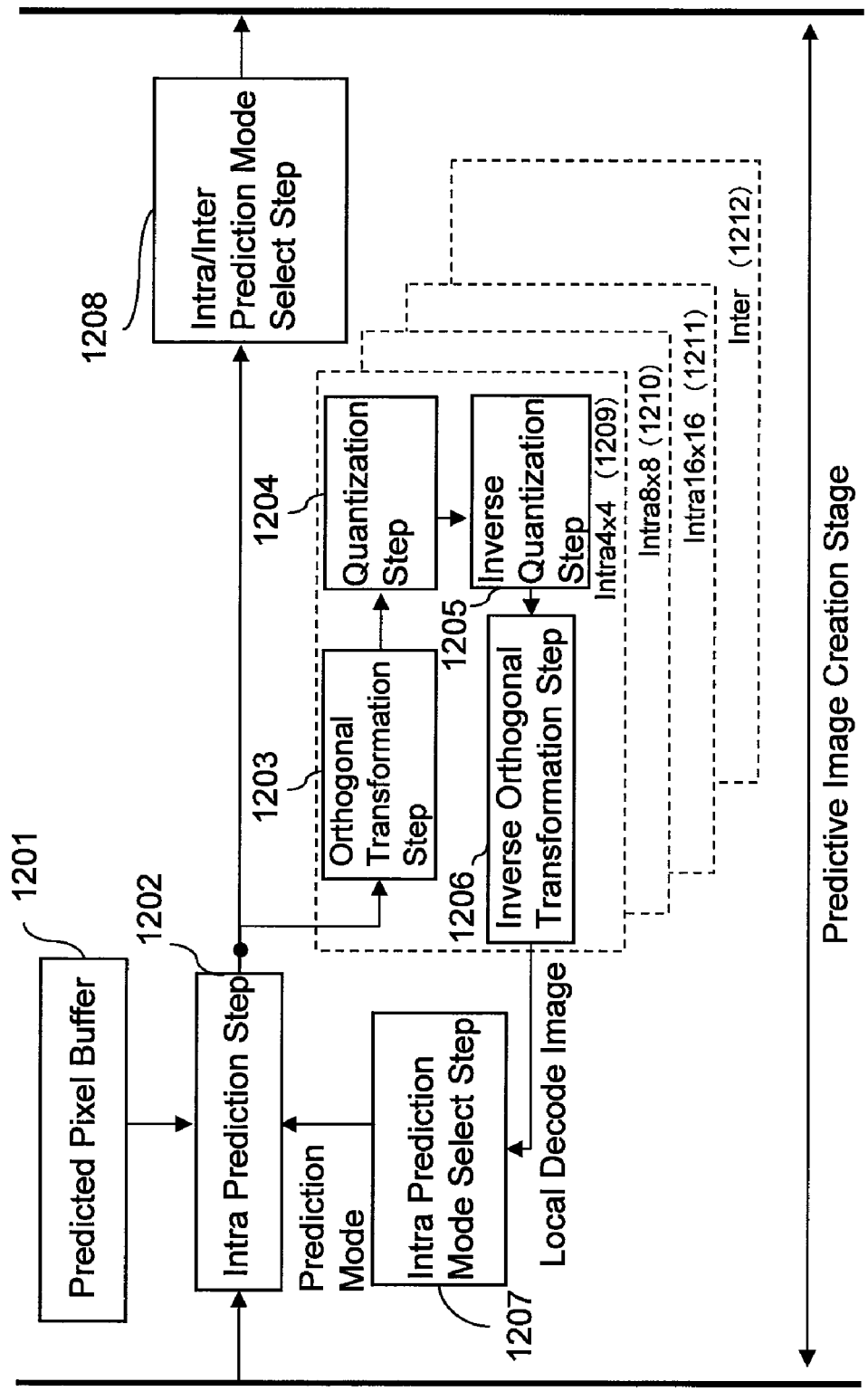
FIG. 14 is an illustration for explaining a stage of predictive image creation in a pipeline arrangement, which the inventors has examined.

FIG. 5 shows an example of a process flow of the intra prediction module. First, predicted pixels of a reference block near an encode-target block are read from a pseudo local decode image (S5010). The predicted pixels thus read out are copied in an appropriate direction of prediction, thereby to create a pseudo predictive image (S5020). The direction of prediction may be the ones shown in FIG. 12, or another one. Next, the encoding cost of an intra prediction mode concerned is calculated based on difference components of the pseudo predictive image and original image, the amount of generated codes, etc. (S5030). The step is repeated on an appropriate block by the number of the modes which enable the prediction thereby to calculate the encoding cost of each mode (S5040). At the end, an intra prediction mode offering the minimum encoding cost is selected (S5050), and then the local decode image stored in the frame memory is used to create an intra predictive image of the prediction mode (S5060).

In this embodiment, the encoding device is not limited to the one shown in FIG. 1 in structure, and it may be an existing encoding system for, e.g., MPEG-2, MPEG-4 or H.264/AVC, which is equipped with the pseudo-local-decode-image-creation module 315 and the intra prediction module 311.

Figure 6:
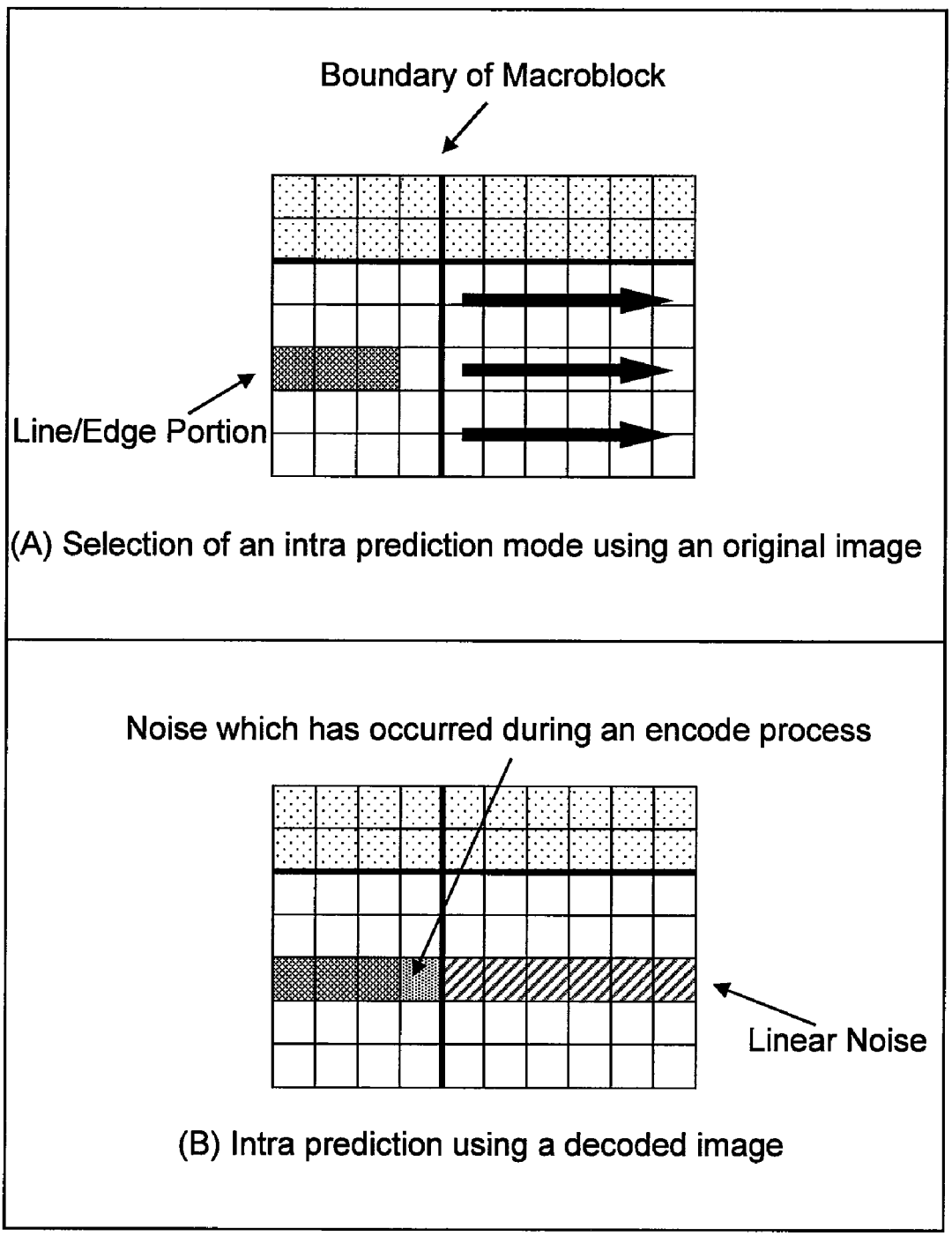
FIGS. 6A and 6B are illustrations showing an effect of the first embodiment of the invention.

In the above-described first embodiment, the intra prediction mode select step larger in processing amount is arranged in a pipeline stage different from the stage where a predictive image is created. As a result, it becomes sufficient to just create a predictive image according to a mode, which has been decided in the stage of selecting an intra prediction mode, in the stage of predictive image creation. Therefore, the need for preparing circuits for the orthogonal transformation (1203), quantization (1204), inverse quantization (1205), and inverse orthogonal transformation (1206) in parallel is eliminated, and thus the reduction in circuit size can be achieved. In addition, as highly accurate pseudo local decode image data can be prepared, even in a case that the select of an intra prediction mode and the creation of a predictive image are arranged in separate pipeline stages, almost the same result as the result at the time of using a local decode image to select a mode can be obtained, and the lowering of the prediction accuracy can be reduced. Here, consideration is given to, e.g., an image such that a line/edge portion lies close to a boundary of a macroblock as shown in FIGS. 6A and 6B. In a case that an decoded image cannot be used in the selection of an intra prediction mode, it is conceivable to use an original image to select a mode. In the example of FIG. 6A, a predicted pixel has no noise. Therefore, a high prediction accuracy is achieved, and a horizontal prediction mode with a small mode number is selected. However, in a case that the encode is performed at a low bit rate, an encoding noise often arises near an edge in a decoded image as in the example of FIG. 6B. In such case, if the horizontal prediction mode is applied, a linear noise, which is not observed in an original image, can arise in a decoded image. In contrast, according to this embodiment, a pseudo local decode image close to an actual decoded image can be used to select an intra prediction mode. Consequently, the number of times that a mode in which a noise like this can arise is selected decreases, and it becomes possible to create a more suitable decoded image.

Second Embodiment

Figure 7:
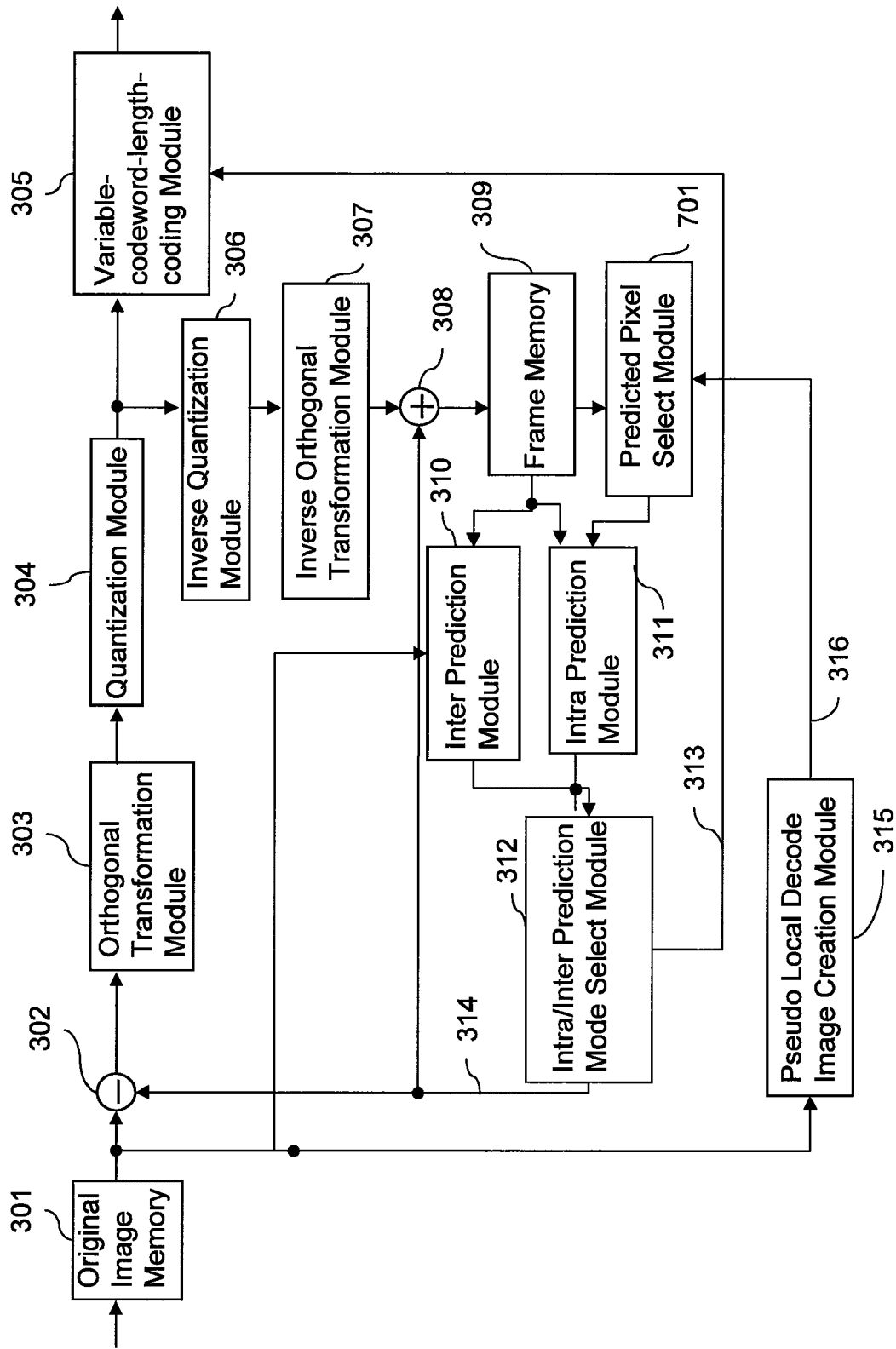
FIG. 7 is a block diagram showing an example of an image encoding device according to a second embodiment of the invention.

FIG. 7 shows an example of an image encoding device according to a second embodiment of the invention. The image encoding device according to the second embodiment differs from the image encoding device of FIG. 1 in that it has a predicted pixel select module (701). Now, it is noted that in FIG. 7, the same constituents as those shown in FIG. 1 are identified by the same reference numerals, and their detailed descriptions are omitted here.

The predicted pixel select module 701 decides whether or not to use predicted pixels of a pseudo local decode image 316 as described with reference to FIG. 1. Usually, an intra prediction mode can be selected more preferably by using a local decode image stored in the frame memory 309 if a reference block for an encode-target block has been already encoded. In this embodiment, local decode image data is used to select an intra prediction mode if a reference block for an encode-target block has been already encoded, and if not, pseudo local decode image data is used to select an intra prediction mode.

The image encoding device of FIG. 7 can appropriately select and use local decode image data and pseudo local decode image data. Therefore, a predictive image can be created more preferably.

Third Embodiment

Figure 8:
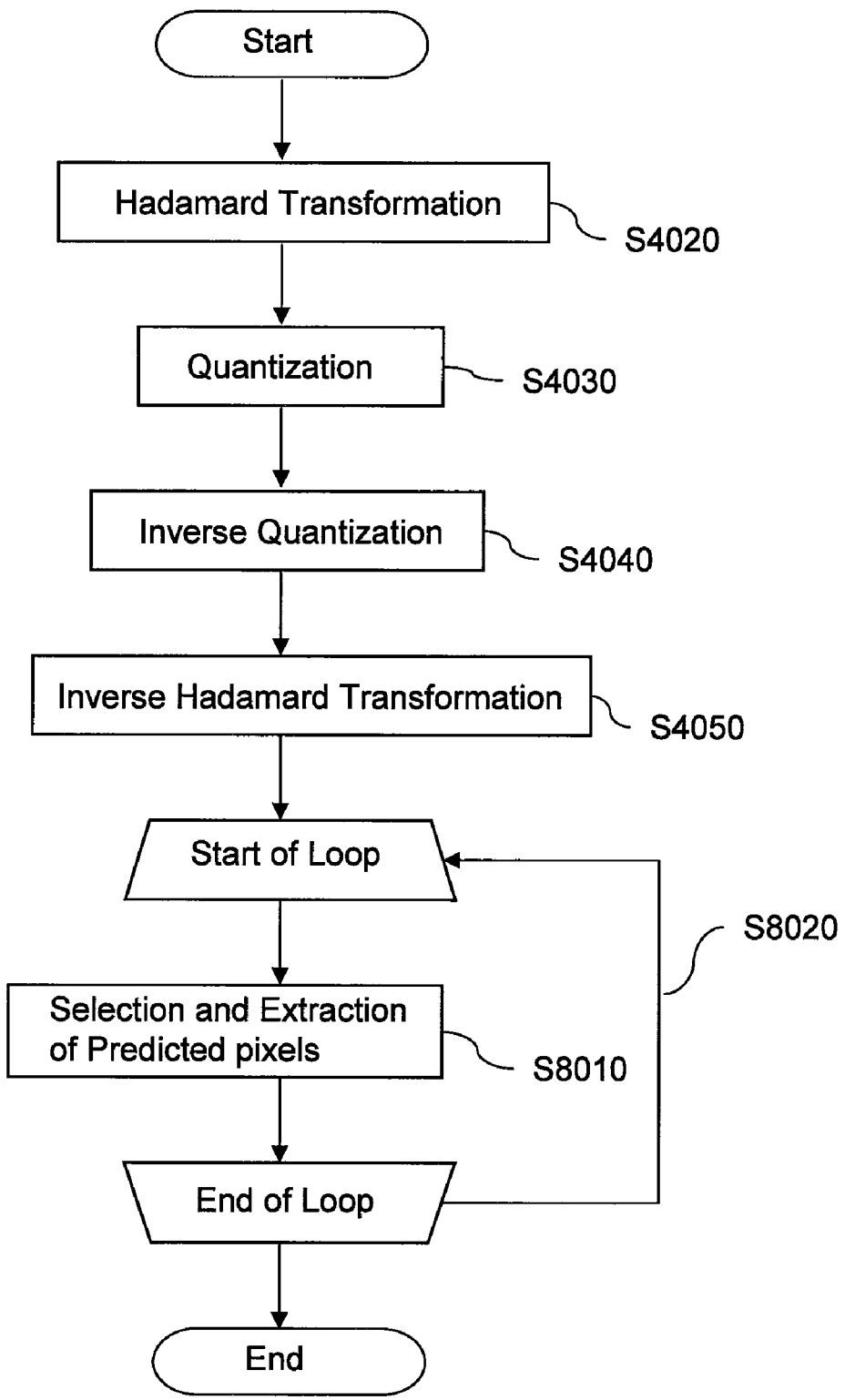
FIG. 8 is a flowchart of a step of creating a pseudo local decode image according to a third embodiment of the invention.

FIG. 8 shows another example of the step of creating a pseudo local decode image. The process in this example differs from the process of FIG. 4 according to the first embodiment in that in the step of creating a pseudo local decode image, pseudo local decode image data of the input block size is used to select and extract a predicted pixel of the sub-block (S8010). Now, it is noted that in FIG. 8, the same steps as those shown in FIG. 4 are identified by the same reference characters or numerals, and their detailed descriptions are omitted.

Figure 9:
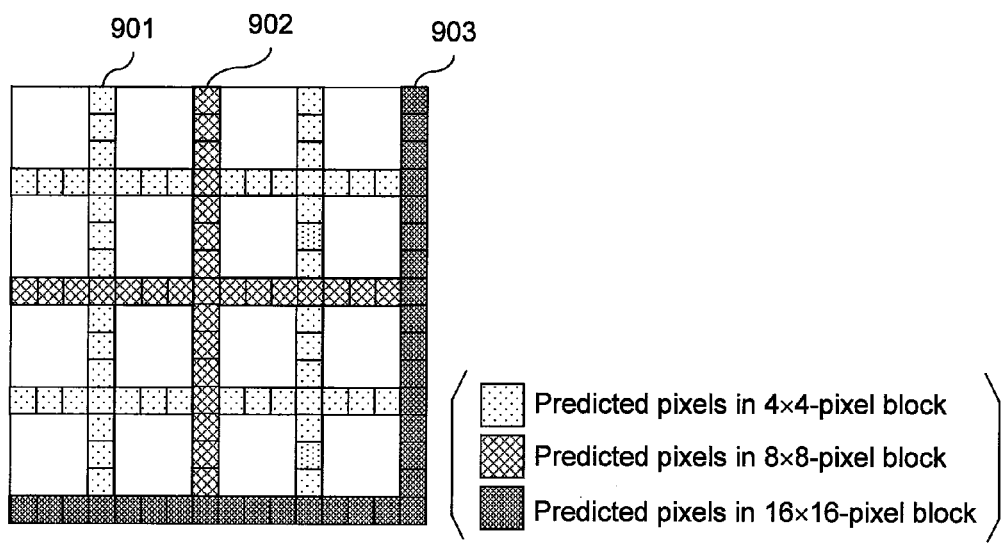
FIG. 9 is an illustration for explaining steps of selecting and extracting predicted pixels according to the third embodiment of the invention.

In the example of FIG. 8, an original image input in blocks is never segmented, and undergoes the Hadamard transformation (S4020), quantization (S4030), inverse quantization (S4040) and inverse Hadamard transformation (S4050). Using a pseudo local decode image thus obtained, a predicted pixel of a sub-block size smaller than the unit of input pixels is selected and extracted (S8010). For example, pseudo local decode images are created in 16×16-pixel blocks as shown in FIG. 9, first. Then, based on them, predicted pixels (901) in 4×4-pixel blocks, predicted pixels (902) in 8×8-pixel blocks, and predicted pixels (903) in 16×16-pixel blocks are selected and extracted. However, as a matter of course, the block size is not limited to them. This step is repeated by the number of the segmented block sizes, whereby predicted pixels required for selecting an intra prediction mode are acquired (S8020).

In the above-described third embodiment, it is sufficient to perform the Hadamard transformation (S4020), quantization (S4030), inverse quantization (S4040), and inverse Hadamard transformation (S4050) only for one block size. Therefore, the processing speed can be achieved.

Fourth Embodiment

Figure 10:
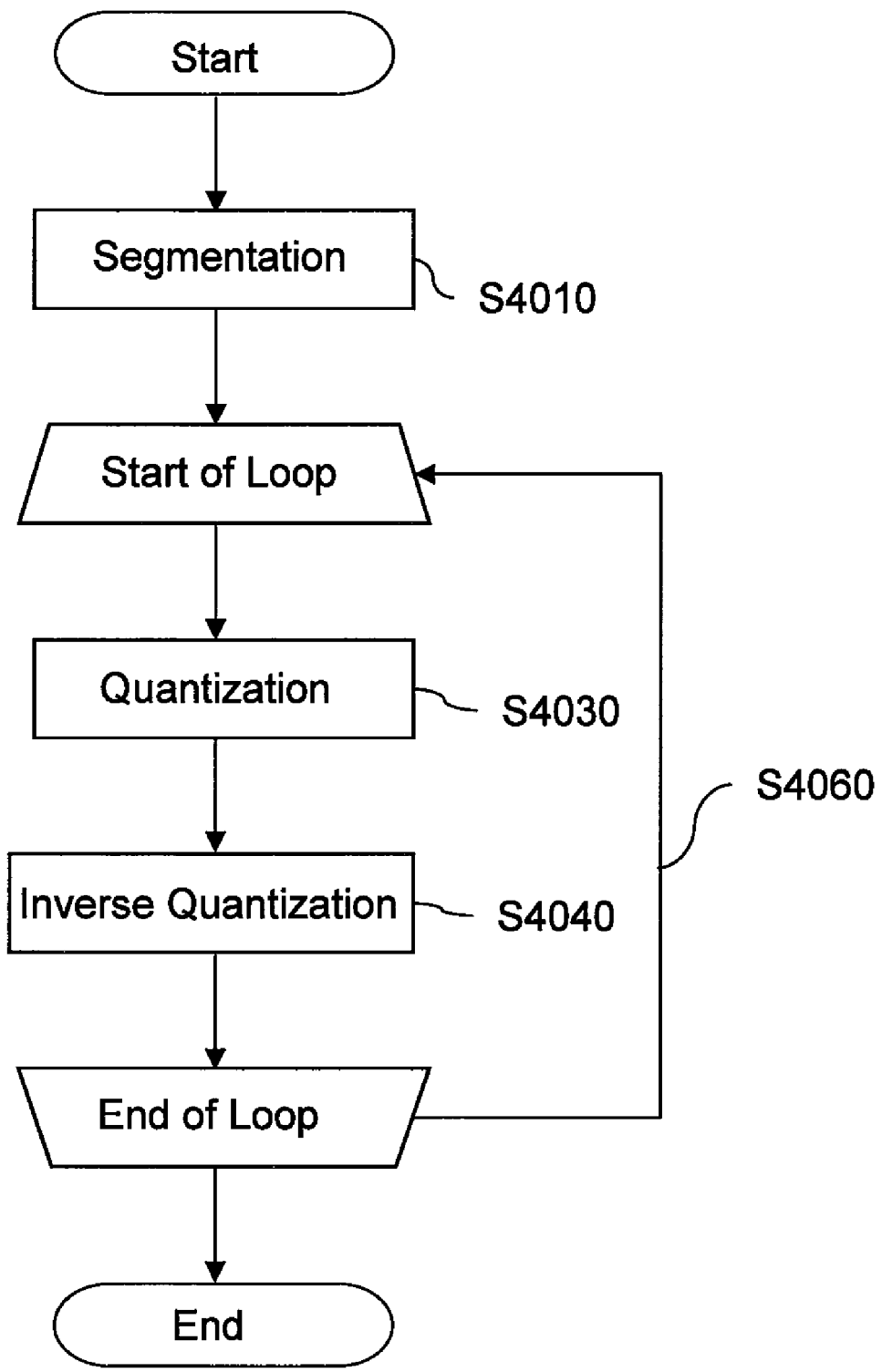
FIG. 10 is a flowchart of a step of creating a pseudo local decode image according to a fourth embodiment of the invention.
Figure 11:
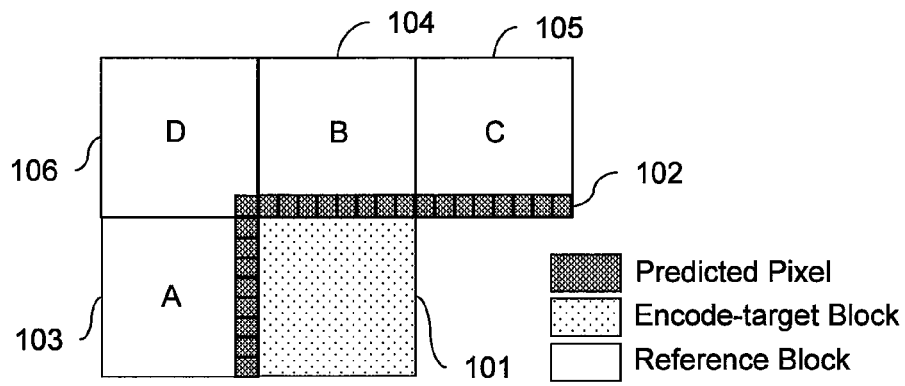
FIG. 11 is an illustration for explaining an intra prediction encoding method which the inventors has examined.

FIG. 10 shows still another example of the step of creating a pseudo local decode image data. The fourth embodiment differs from the first embodiment in that in the step of creating a pseudo local decode image, pseudo local decode image data is created by quantization (S4030) and inverse quantization (S4040) without conducting the orthogonal transformation. Now, it is noted that in the process according to the fourth embodiment, the same constituents as those in the process according to the first embodiment are identified by the same reference characters or numerals, and their detailed descriptions are omitted. In the fourth embodiment, the orthogonal transformation, which needs a processing time, is not performed, and just executions of the quantization (S4030) and inverse quantization (S4040) suffice. Therefore, the processing speed can be increased.

While the invention made by the inventors has been described above based on the embodiments specifically, it is not so limited. It is obvious that various changes and modifications may be made without departing from the scope of the invention.

The invention claimed is:

1. An image encoding device which can encode a difference between original image data and predictive image data, and create the predictive image data based on local decode image data obtained by decode of encoded data, comprising:
    an intra prediction module operated to create the predictive image data by means of intra prediction in blocks of pixels resulting from division of a frame of image data; and
    a pseudo-local-decode-image-creation module operated to more simply encode and decode original image data in comparison to creation of the local decode image data,
    wherein the intra prediction module has a mode select module for selecting an intra prediction mode, and a predictive data creation module for creating the predictive image data by means of intra prediction according to the operation mode selected by the mode select module, and
    the mode select module can use pseudo local decode image data created by the pseudo-local-decode-image-creation module to select an intra prediction mode.

2. The image encoding device according to claim 1, wherein the pseudo-local-decode-image-creation module performs Hadamard transformation, quantization, inverse quantization, and inverse Hadamard transformation thereby to create pseudo local decode image data.

3. The image encoding device according to claim 1, wherein the pseudo-local-decode-image-creation module performs quantization and inverse quantization thereby to create pseudo local decode image data.

4. The image encoding device according to claim 1, wherein the intra prediction module arranges the mode select module and the predictive data creation module to execute respective process steps in different pipeline stages.

5. The image encoding device according to claim 1, further comprising a predicted pixel select module for deciding whether or not to use predicted pixel data of a pseudo local decode image for mode selection by the mode select module,
    wherein in case that the predicted pixel select module has decided to use predicted pixel data of a pseudo local decode image, the mode select module uses predicted pixel data of a pseudo local decode image to select a mode, and
    in case that the predicted pixel select module has decided not to use predicted pixel data of a pseudo local decode image, the mode select module uses predicted pixels of local decode image data to select a mode.

6. The image encoding device according to claim 1, wherein the pseudo-local-decode-image-creation module uses pseudo local decode image data of an input pixel block to select and extract predicted pixel data of sub-blocks.

7. An image encoding method, comprising:
    a first step of encoding a difference between original image data and predictive image data;
    a second step of decoding data encoded in the first step to create local decode image data;
    a third step of more simply encoding and decoding original image data in comparison to creation of the local decode image data to create pseudo local decode image data;
    a fourth step of using the pseudo local decode image data created in the third step to select an intra prediction mode; and
    a fifth step of creating the predictive image data by means of intra prediction using the local decode image data, according to the operation mode selected in the fourth step.

8. The image encoding method according to claim 7, wherein the second step includes performing Hadamard transformation, quantization, inverse quantization, and inverse Hadamard transformation thereby to create pseudo local decode image data.

9. The image encoding method according to claim 7, wherein the second step includes performing quantization and inverse quantization thereby to create pseudo local decode image data.

10. The image encoding method according to claim 7, wherein the third and fourth steps are executed in different pipeline stages.

11. An image encoding method comprising:
    a first step of encoding a difference between original image data and predictive image data;
    a second step of decoding data encoded in the first step to create local decode image data;
    a third step of more simply encoding and decoding original image data in comparison to creation of the local decode image data to create pseudo local decode image data;
    a fourth step of deciding whether or not to use the pseudo local decode image data created in the third step for selecting an intra prediction mode;
    a fifth step which includes using the pseudo local decode image data to select an intra prediction mode in case that use of the pseudo local decode image data has been decided in the fourth step, and using the local decode image data to select an intra prediction mode in case hat nonuse of the pseudo local decode image data has been decided in the fourth step; and
    a sixth step of creating the predictive image data by means of intra prediction according to the operation mode selected in the fifth step.

* * * * *